United States Patent [19]

Asai et al.

[11] Patent Number: 4,603,157

[45] Date of Patent: Jul. 29, 1986

[54] INTERMEDIATE FOR COMPOSITE MATERIAL

[75] Inventors: Hajime Asai; Fujio Nakao, both of Ohtake, Japan

[73] Assignee: Mitsubishi Rayon Co., Ltd., Tokyo, Japan

[21] Appl. No.: 735,749

[22] Filed: May 20, 1985

[30] Foreign Application Priority Data

May 23, 1984 [JP] Japan ................................ 59-104294
May 23, 1984 [JP] Japan ................................ 59-104295

[51] Int. Cl.$^4$ .............................................. C08K 3/04
[52] U.S. Cl. .................................... 523/440; 523/468; 524/495; 428/408
[58] Field of Search ................ 523/440, 468; 524/495; 428/367, 408

[56] References Cited

U.S. PATENT DOCUMENTS 4,446,255  5/1984  Ying et al. ............................ 523/468
4,487,880  12/1984  Ueno et al. ........................... 523/440

FOREIGN PATENT DOCUMENTS 52-58799  5/1977  Japan ................................. 523/468
59-111839  6/1984  Japan ................................. 524/495

*Primary Examiner*—Lewis T. Jacobs
*Attorney, Agent, or Firm*—Oblon, Fisher, Spivak, McClelland & Maier

[57] ABSTRACT

An intermediate for composite materials which comprises a carbon fiber or a graphite fiber having a tensile strength of 300 to 600 kg/mm$^2$ and a tensile modulus of 30 to 50 t/mm$^2$ and giving an intensity of electric current per unit surface area as determined by a potential sweep method in the range of 0.1 to 0.4 $\mu$A/cm$^2$ and a matrix resin.

4 Claims, No Drawings

INTERMEDIATE FOR COMPOSITE MATERIAL

TECHNICAL FIELD

This invention relates to a high temperature curing type intermediate for composite materials (namely, prepreg) excellent in tensile and flexural strength reinforced with high strength and high modulus carbon fibers or graphite fibers (hereafter sometimes referred to generically as carbon fibers).

BACKGROUND ART

The demand for higher performanced carbon fibers is becoming stronger recently. Particularly in the field of aircraft, there is strongly required high elongation and high modulus carbon fibers. Such requirement has been directed more to enhancement of composite properties rather than to the carbon fiber itself.

Under these situations of requirement of the market, the tensile strength of PAN-based high modulus carbon fibers having 30 to 50 ton/mm$^2$ modulus has been markedly improved to be 300 kg/mm$^2$ or more based on the improvement in precursors and optimization of carbonization techniques.

The tensile strength of carbon fiber is generally determined, as described in JIS-R-7601, with specimens in the state of a strand, one of the forms of composite materials. Studies made by the present inventors have revealed that the tensile strength of carbon fibers in the strand test is markedly influenced by the characteristic of matrix resins and the interfacial bond strength. The matrix resin used in aircraft is usually a thermosetting resin of heat-resistant type called "350° F.-type", and is a brittle and low elongation type owing to its high curemolding temperature and high crosslinking density. The present inventors have now reached the conclusion that the tensile strength of the composite decreases with increasing brittleness of the matrix resin as in 350° F. type resin and the tendency becomes stronger with increase of the tensile strength of the carbon fiber. More importantly, the tensile strength of the composite of 350° F. type resin reinforced with the high strength and high modulus carbon fiber decreases as the interfacial bond strength increases.

Conceivable reasons for this include the following. First, since residual strain due to cureshrinkage is large in 350° F.-type matrix resins, residual stress tends to be more concentrated in the neighborhood of the fiber with increasing interfacial bond strength. Secondly, 350° F.-type matrix resin is a so brittle type that the cohesive failure of the resin phase tends to proceed from the initial breaking point of the fiber by notch effect when the interfacial bond strength is high, which results the breakages of sub-bundles of 50 to 100 filaments leading to the whole breakage of the composite; moreover, such a tendency becomes stronger with increasing strength of carbon fibers because of the high fracture energy. In any way, it has been revealed that the tensile strength of composites of a high strength carbon fiber and a 350° F.-type brittle matrix resin is rather decreased when the interfacial bond strength is too high.

Further, it has been revealed that the flexural strength of composites sometimes shows, much lower value than that expected from the rule of mixture, unlike the flexural modulus, namely the translation rate of fiber strength is sometimes markedly low, and moreover the translation rate tends to decrease with the increase of tensile strength. The reason for this is considered to be that the flexural strength of composite material is greatly influenced by the interfacial bond strength between the fiber and the matrix resin as well as failure behaviour, and the influence becomes stronger as the fiber strength is more improved and resultantly the fracture energy is increased.

It has been revealed that the flexural strength of composites is strongly dependent on the level of surface treatment, decreasing both when the interfacial bonding strength is too high and when it is too low, and thus there exists an optimum interfacial bond strength, namely an optimum surface state, for the flexural strength.

Accordingly, the optimum surface state for tensile strength is not always optimum for flexural strength of composite materials, which can result in the decrease of translation properties in flexural strength and renders it difficult to make the most of the improved strength of the reinforcement.

Further, since the optimum surface state varies greatly depending on the difference of starting fibers or heat-treatment conditions even when the surface-treatment conditions are the same, it is necessary for the surface treatment to be properly performed in correspondence with the above variations.

The present inventors made extensive studies about surface characteristic of the high performanced carbon fiber to give the optimum interfacial bond strength for balancing the tensile strength against the flexural strength of the composite material, and as a result attained this invention.

OBJECT OF THE INVENTION

The object of this invention is to provide a prepreg comprising a heat-resistant type (350° F.-type) epoxy resin and a carbon fiber having a suitable interfacial bond strength which can make its tensile strength best exhibited in the composite, and thus to provide a highly heat-resistant composite material having a high tensile strength and an excellent flexural strength suitable to be used for aeroplanes and the like.

CONSTRUCTION OF THE INVENTION

The essential of this invention is an intermediate for composite materials which comprises a carbon fiber or a graphite fiber having a tensile modulus of 30 to 50 t/mm$^2$, a tensile strength of 300 to 600 kg/mm$^2$ and giving an intensity of electric current per unit area as determined by a potential sweep method in the range of 0.1 to 0.4 $\mu$A/cm$^2$, preferably 0.15 to 0.3 $\mu$A/cm$^2$, and a matrix resin.

The potential sweep method referred to in this invention is a method of electrochemical determination conducted by means of an analytical apparatus, generally called voltammetric analyzer, consisting of a potentiostat and a function generator by using a carbon fiber as the working electrode. In this invention, 5% aqueous phosphoric acid solution is used, the pH is adjusted to 3.0, and nitrogen gas is bubbled through the solution to obviate the effect of residual oxygen. An Ag/AgCl standard electrode is used as the reference electrode, a carbon fiber tow is served as the working electrode in the electrolytic solution, and a platinum electrode having a sufficient surface area is used as the counter electrode.

The measurement can be made with samples in any desired form including tow, sheet, cloth and paper so long as they can be fixed as an electrode, and also with samples to which some resin components such as sizing agent or matrix resin have adhered. In the latter case, however, since the effective surface area of the sample changes, the resin component is preferably removed by extraction beforehand. Although a tow of 50 mm length and 12,000 filaments was chosen as a standard form of the sample, the amount of the sample needs not be specifically restricted when the result of determination is calculated in terms of current intensity per unit area, ipa, as defined in this invention.

The potential range applied between the carbon fiber electrode and the counter electrode should be set within a range not exceeding the standard electrode potential. With 5% aqueous phosphoric acid solution, a range of $-0.2$ V to $+0.8$ V was taken as the standard. Since the intensity of current produced by potential scanning has a dependency on scanning rate, the rate must be always kept constant. In this invention, the rate of 20 mV/sec was chosen as the standard. Current-potential curves were plotted by using an X-Y recorder. After sweeping 3 times or more until the curves became stable, the current intensity was read off at any arbitrarily selected standard potential, at $+0.4$ V in this invention against the reference electrode, and ipa was calculated from the following equation:

$$ipa = i\,(\mu A) / \left[ \text{sample length (cm)} \times \left( \frac{4\pi \cdot \text{weight of fiber per length (g/cm)} \cdot \text{filament number}}{\text{density (g/cm}^3)} \right)^{\frac{1}{2}} \right]$$

An apparent surface area was calculated from the sample length, sample density and sample weight per unit length determined according to the method described in JIS R 7601, and then the current intensity was divided by the surface area thus obtained to give ipa.

As is apparent also from the Examples given later, it has been been revealed that the ipa obtained by the potential sweep method is in good correspondence with the interfacial characteristic of composite materials and that the tensile strength and the flexural strength of composite materials can be most fully exhibited by controlling ipa values within the range defined in this invention.

There has not yet been known any example wherein the measured current intensity obtained by the potential sweep method was investigated in relation to the strength properties of composite materials. The existence of such correlation has been revealed only after the extensive studies of the present inventors. The characteristic values obtained by the potential sweep method are presumably reflective of some characteristics corresponding to the concentration of functional groups participating in oxidation-reduction reaction on the car fiber surface and to the physical surface area of the fiber. Since the characteristic value defined in this invention is related to both physical and chemical characteristics and can be determined in any arbitrarily selected sample size and by simple means, it is of great practical significance.

In order that the composite material aimed at in this invention can be obtained, the surface characteristic value of the carbon fiber determined by the potential sweep method, ipa, should be in the range of 0.1 to 0.4 $\mu A/cm^2$, preferably 0.15 to 0.3 $\mu A/cm^2$. When ipa is less than 0.1 $\mu A/cm^2$ the interfacial bond strength of the composite material obtained is too weak, whereas when it is over 0.4 $\mu A/cm^2$ the interfacial bond strength is too strong, both cases giving an inferior product of low tensile strength as well as low flexural strength.

The carbon fibers referred to in this invention are not limited to those of PAN-base; they include also those of pitch-base and cellulose-base. Also, there is no limitation as to the process for production of the fibers. They may also be graphite fibers obtained by heat-treating carbon fibers at higher temperatures. For aircraft, however, those having a modulus in the range of 20 to 35 $t/mm^2$ are commonly used.

The matrix resin used in this invention is preferably a resin composition containing at least 40% by weight of a trifunctional or tetrafunctional glycidyl compound. Examples of the trifunctional glycidyl compounds include epoxy compounds such as triglycidyl-m-aminophenol, triglycidyl-p-aminophenol triglycidyl ether of phenol-aldehyde novolac, triglycidyl ether of o-cresol-aldehyde novolac and diglycerol triglycidyl ether. Examples of tetrafunctional glycidyl compounds include tetraglycidyldiaminodiphenylmethan, tetraglycidyl ether of phenol-aldehyde novolac and tetraglycydyl ether of o-cresol-aldehyde novolac. Besides these polyfunctional glycidyl compounds, there may be incorporated into the composition aromatic diamines such as diaminodiphenylmethane and diaminodiphenyl sulfone as the curing agent component and further polyether sulfone, bismaleimide, or other third component. In these cases, the proportion of polyfunctional glycidyl compounds is preferably at least 40% by weight. These resin compositions are mixed with a curing catalyst such as monoethylamine salt of boron trifluoride and formed into prepreg containing normally 30 to 45% of the resin.

These heat-resistant type prepregs comprising a trifunctional or tetrafunctional glycidyl compound is normally cure-molded at a temperature not lower than 170° C., but they can be aftercurred at higher temperatures as occasion demands.

The "intermediate" referred to in this invention is a carbon fiber impregnated with matrix resin in the form of tape, sheet, cloth, or pellet, and includes so-called UD (unidirectional) prepreg, cross prepreg, sleeve and the like. In the determination of the characteristic value, ipa, of these intermediates, it is preferable to use them as the sample after removing the adhering resin by extraction with a solvent.

EFFECT OF THE INVENTION

The intermediate for composite materials according to this invention is obtained by combining a carbon fiber or a graphite fiber having an excellent surface characteristic with a special epoxy resin, and enables the production of a prepreg particularly suited for use in aircraft.

This invention will be described in more detail below with reference to Examples. Physical properties were examined by the following methods.

The tensile strength and modulus of carbon fibers were determined according to JIS-R 7601. Thus, 100 parts of tetraglycidyldiaminodiphenylmethan was mixed with 30 parts of diaminodiphenylmethan and 1 part of boron trifluoride monoethylamine and the mixture was dissolved in methyl ethyl ketone to form a 50% solution. Carbon fiber tow was impregnated with the solution, then the solvent was removed by drying, and the resulting product was cured at 170° C. for 5 hours to give a strand, which was then subjected to tensile test.

The flexural properties of the composite was evaluated according to ASTM D-790. Carbon fiber tow was impregnated with a resin solution prepared as described above to obtain a unidirectional prepreg. The prepreg was cure-molded at 170° C. for 5 hours to give a plate-formed composite material having a $V_f$ of 60%. A test piece 10 mm × 100 mm × 2 mm in size was cut out from the composite material and subjected to the three-points bending test.

Table 1 shows ipa, strand characteristic, and the flexural properties of the composite thus obtained. Experiment Nos. 1 to 6 are those wherein the heat treatment conditions are the same and the surface treatment conditions were varied. The optimum conditions for the tensile strength are different from those for the flexural strength. The strength properties can be most fully exhibited by controlling ipa into the range of 0.10 to 0.40 $\mu A/cm^2$. Experiment Nos. 7 to 11 are those wherein the preoxidation treatment conditions before carbonization and the surface treatment conditions after carbonization were varied. It can be seen from the results that even when the tensile strength is high the flexural strength is not high and the translation rate of strength is markedly low unless ipa is within the optimum range. In the Table, Nos. 1, 6, 7, 8 and 11 represent comparative experiments.

TABLE 1

| Experiment No. | Tensile test of strand | | ipa ($\mu A/cm^2$) | Bending test of composite | | Translation rate of strength (%) | Translation rate of modulus (%) |
| --- | --- | --- | --- | --- | --- | --- | --- |
| | Strength ($kg/mm^2$) | Modulus ($t/mm^2$) | | Strength ($kg/mm^2$) | Modulus ($t/mm^2$) | | |
| 1 (Comparative) | 504 | 29.7 | 0.059 | 210 | 16.8 | 69 | 94 |
| 2 | 508 | 30.2 | 0.105 | 243 | 16.3 | 80 | 90 |
| 3 | 500 | 30.8 | 0.165 | 248 | 17.1 | 83 | 93 |
| 4 | 474 | 30.5 | 0.222 | 256 | 16.5 | 90 | 90 |
| 5 | 422 | 30.2 | 0.315 | 232 | 16.6 | 92 | 92 |
| 6 (Comparative) | 413 | 29.8 | 0.427 | 173 | 15.9 | 70 | 89 |
| 7 (Comparative) | 525 | 31.2 | 0.043 | 188 | 16.2 | 60 | 87 |
| 8 (Comparative) | 443 | 30.7 | 0.038 | 190 | 16.7 | 71 | 91 |
| 9 | 515 | 30.3 | 0.208 | 245 | 16.4 | 79 | 90 |
| 10 | 421 | 30.0 | 0.210 | 230 | 16.8 | 91 | 93 |
| 11 (Comparative) | 434 | 30.5 | 0.525 | 168 | 16.0 | 65 | 87 |

EXAMPLE 1

With the non-sized PAN-based carbon fiber of 30 $t/mm^2$ modulus, ipa was determined by using a cyclic voltammetric analyzer. Type P-1100 (mfd. by Yanagimoto Seisakusho). Potential sweep was conducted in 5% aqueous phosphoric acid solution at pH 3 by using the carbon fiber tow of 6000 filaments having a sample length of 50 mm as the working electrode and a platinum electrode as the counter electrode, the potential range applied between said two electrodes being from −0.2 V to +0.8 V and the scanning rate being 20 mV/sec. The change of current intensity was detected by using an X-Y recorder. The current intensity i at +0.4 V against the potential of the Ag/AgCl electrode was read off and ipa was calculated therefrom by using the values of the sample weight per unit length of $3.8 \times 10^{-3}$ g/cm and the sample density of 1.750 g/cm$^3$.

EXAMPLE 2

The carbon fiber having tensile modulus of 32 to 33 $t/mm^2$ and tensile strength of 400 to 470 kg/mm$^2$ obtained by heat treatment of an acrylic-type precursor at high temperature and the carbon fibers obtained in Example 1 were further heat-treated at high temperature to give graphite fibers having tensile modulus of 35 to 38 $t/mm^2$ and tensile strength of 380–430 kg/mm$^2$. The graphite fibers thus obtained were evaluated in the same manner as in Example 1. Values of weight per unit length of $7.3 \times 10^{-3}$ g/cm and density of 1.76 g/cm$^3$ were used for calculation. In Table 2, Nos. 12 and 13 refer to the results obtained with samples subjected to carbonization treatment alone, and Nos. 14 to 17 refer to those with samples subjected to graphitization treatment. It is apparent from the Table that high performanced carbon fibers can be obtained by control of ipa irrespective of heat treatment conditions. Experiment Nos. 16 and 17 refer to comparative experiments.

TABLE 2

| Experiment No. | Tensile test of strand | | ipa ($\mu A/cm^2$) | Bending test of composite | | Translation rate of strength (%) | Translation rate of modulus (%) |
| --- | --- | --- | --- | --- | --- | --- | --- |
| | Strength ($kg/mm^2$) | Modulus ($t/mm^2$) | | Strength ($kg/mm^2$) | Modulus ($t/mm^2$) | | |
| 12 | 462 | 32.1 | 0.182 | 228 | 17.0 | 82 | 88 |
| 13 | 408 | 33.0 | 0.178 | 234 | 18.2 | 96 | 92 |
| 14 | 423 | 35.3 | 0.135 | 196 | 18.8 | 77 | 89 |

TABLE 2-continued

| Experiment No. | Tensile test of strand | | ipa (μA/cm²) | Bending test of composite | | Translation rate of strength (%) | Translation rate of modulus (%) |
| --- | --- | --- | --- | --- | --- | --- | --- |
| | Strength (kg/mm²) | Modulus (t/mm²) | | Strength (kg/mm²) | Modulus (t/mm²) | | |
| 15 | 414 | 38.6 | 0.262 | 192 | 20.4 | 77 | 88 |
| 16 (Comparative) | 430 | 35.2 | 0.031 | 175 | 18.7 | 68 | 89 |
| 17 (Comparative) | 380 | 35.0 | 0.327 | 163 | 19.2 | 71 | 91 |

EXAMPLE 3

PAN-based carbon fibers having a modulus of 24 t/mm² were further heat-treated at high temperature to graphite fibers having moduli of about 40 t/mm². The determination of ipa, the tests with strands and composites were performed in the same manner as in Example 1 by varying graphitization conditions and surface treatment conditions. Values of weight per unit length of $7.3 \times 10^{-3}$ g/cm, density of 1.81 g/cm³, and filament number of 12,000 were used for calculation. It can be seen from the Table that both the flexural strength and the translation rate are high when ipa is in the neighborhood of from 0.15 to 0.30 μA/cm². In the Table, Nos. 18 and 22 refer to comparative experiments.

TABLE 3

| Experiment No. | Tensile test of strand | | ipa (μA/cm²) | Bending test of composite | | Translation rate of strength (%) | Translation rate of modulus (%) |
| --- | --- | --- | --- | --- | --- | --- | --- |
| | Strength (kg/mm²) | Modulus (t/mm²) | | Strength (kg/mm²) | Modulus (t/mm²) | | |
| 18 (Comparative) | 380 | 39.8 | 0.042 | 131 | 22.3 | 57 | 93 |
| 19 | 366 | 40.2 | 0.109 | 154 | 21.8 | 70 | 90 |
| 20 | 395 | 40.4 | 0.187 | 161 | 21.3 | 68 | 88 |
| 21 | 373 | 39.5 | 0.291 | 166 | 22.0 | 74 | 93 |
| 22 (Comparative) | 310 | 40.1 | 0.413 | 110 | 21.5 | 59 | 89 |

What is claimed is:

1. An intermediate for composite materials which comprises a carbon fiber or a graphite fiber having a strand modulus of 30 to 50 t/mm² and a tensile strength of 300 to 600 kg/mm² and giving an intensity of electric current per unit area as determined by a potential sweep method in the range of 0.1 to 0.4 μA/cm² and a matrix resin.

2. An intermediate according to claim 1 wherein the carbon fiber or the graphit,e fiber is one which gives an intensity of electrc current per unit area as determined by a potential sweep method of 0.15 to 0.3 μA/cm .

3. An intermediate according to claim 1, wherein the matrix resin is a resin composition comprising at least 40% by weight of a trifunctional or tetrafunctional glycidyl compound.

4. An intermediate for composite materials comprising a carbon fiber or a graphite fiber having a tensile modulus of 30 to 50 t/mm² and a tensile strength of 300 to 600 kg/mm² and giving an intensity of electric current as determined by a potential sweep method of 0.1 to 0.4 μA/cm², which is obtained by a process comprising subjecting a carbon fiber or a graphite fiber having a tensile modulus of 30 to 50 t/mm² and a tensile strength of 300 to 600 kg/mm² to determination by a potential sweep method, selecting a carbon fiber or a graphite fiber giving a current intensity per unit area of 0.1 to 0.4 μA/cm², and combining the thus selected fiber with a matrix resin.

* * * * *

UNITED STATES PATENT AND TRADEMARK OFFICE
CERTIFICATE OF CORRECTION

PATENT NO. : 4,603,157
DATED : JULY 29, 1986
INVENTOR(S) : HAJIME ASAI AND FUJIO NAKAO

It is certified that error appears in the above-identified patent and that said Letters Patent is hereby corrected as shown below:

Column 3, line 21, please delete "20 mV/sec" and insert --2.0 mV/sec--;

Column 5. line 51, please delete "20 mV/sec." and insert --2.0 mV/sec.--

Signed and Sealed this

Thirtieth Day of December, 1986

Attest:

DONALD J. QUIGG

Attesting Officer

Commissioner of Patents and Trademarks